United States Patent [19]

Lopata

[11] Patent Number: 5,445,064
[45] Date of Patent: Aug. 29, 1995

[54] SKEWER FOR ROTIESSERIE

[76] Inventor: Ira L. Lopata, 234 Eden Rd., Palm Beach, Fla. 33480

[21] Appl. No.: 347,922

[22] Filed: Dec. 1, 1994

[51] Int. Cl.⁶ ............................................. A47J 37/04
[52] U.S. Cl. .................................... 99/421 H; 99/419; 99/448
[58] Field of Search ................ 99/419–421 V, 99/532, 448–450, 426, 427, 482, 339, 340; 126/41 B, 25 R, 9 R

[56] References Cited

U.S. PATENT DOCUMENTS

| | | | |
|---|---|---|---|
| 472,595 | 4/1892 | Wachs | 99/421 H |
| 652,660 | 6/1900 | Bradlee | 99/421 H |
| 2,245,220 | 6/1941 | Nelson | 99/421 H |
| 2,762,293 | 9/1956 | Boyajian | 99/421 P |
| 3,125,015 | 3/1964 | Schlaegel | 99/421 P |
| 3,196,776 | 7/1965 | Norton | 99/421 P |
| 3,744,403 | 7/1973 | Castronuovo | 99/421 V |
| 4,258,617 | 3/1981 | Akwei | 99/419 |
| 4,409,452 | 10/1983 | Oouchi et al. | 126/41 B |
| 4,985,607 | 1/1991 | Oya | 126/238 |
| 5,184,540 | 2/1993 | Riccio | 99/419 |
| 5,367,950 | 11/1994 | Sarich | 99/449 |

*Primary Examiner*—Timothy F. Simone
*Attorney, Agent, or Firm*—Norman Friedland

[57] ABSTRACT

The skewer for a rotisserie for roasting chicken and the like is formed from a single piece with a straight spine portion having angularly extended drive wings fitting into the cavity of the chicken for positive rotation thereof. The skewer rotates with the reel plate of the rotisserie and relative to and includes support ends for mounting in the reel plates of the rotisserie that include constraints for limiting axial movement for precluding the possibility of inadvertent dislodgement of the skewer from the reel plates. The absence of corners, welds and crevices and the like facilitate cleanliness and avoids the propensity of collecting bacteria and potentially toxic substances.

9 Claims, 4 Drawing Sheets

SKEWER FOR ROTIESSERIE

CROSS REFERENCES

This invention relates to the subject matter disclosed in copending patent application (Ser. No. 08/847,923) filed on even date by the inventor common to this patent application and entitled "Skewer Driver for Rotisserie" and in copending patent application (Ser. No. 08/347,924) filed on even date by the inventor common to this patent application and entitled "Self Centering Means of a Planetary System for a Rotisserie".

Technical Field

This invention relates to rotisseries for cooking chickens or other like foods and particularly to the spit or skewer used in the rotisserie.

Background Art

As is well known in the field of cooking, roasted and broiled chickens served in commercial eating establishments has become extremely popular in the past few years and that commercial cooking apparatus for cooking the chickens have been in high demand. One of the concerns when serving food to the public is that the apparatus used must be sanitary and free from bacteria or other potentially toxic contamination. Obviously, many types of personnel are employed to handle and clean the utensils that are used in cooking and hence, it is abundantly important that these utensils are easy to clean and to keep sanitary. One of the problems associated with commercial types of rotisseries is that the skewer is designed to hold several chickens and hence must be structurally sufficient to accommodate this problem. As a result, many of the spits of the type that rotate relative to a rotating drum are fabricated from several pieces that are joined by welding or other types of bonding methods where crevices and tight corners are formed which are difficult to clean and hence, become a source of supporting undesirable growths such as bacteria and the like. In other designs, the skewer includes a fork-like element or tines that are inserted in the chicken to prevent it from rotating relative to the skewer and these tines are attached to the skewer by some type of collar and screw or wing nut assembly. Again these devices have the propensity of retaining food bits and are difficult to clean.

Another example of a spit is disclosed in U.S. Pat. No. 5,184,540 granted to Riccio on Feb. 9, 1993 and entitled "Cooking Apparatus with Rotisserie and Reclamation Trap". The spit in this disclosure include three equi-spaced radially extending fins extending the length of the spit defining drive shoulders that serve to rotate the food being cooked in the rotisserie. The fins are formed such that each at the central axis touch each other and form relatively tight corners. Again, these corners are in essence crevices that are somewhat difficult to clean and hence can collect food particles and end up with unsatisfactory sanitation problems.

The cleaning problem in all types of rotisseries is acerbated by the fact that the chickens notoriously contain fat that melts in the cooking process which, in turn, drip and collect and accumulate on the various components of the rotisserie. It is to be understood that the type of rotisserie that is the concern in this invention is the types where the chickens are inserted on a skewer and the skewer is supported to a drum that rotates about a central axis of the rotisserie and the skewer rotates relative to the drum.

I have found that I can obviate the problems noted in the above paragraphs by providing a skewer that is fabricated from a single metal piece that eliminates tight corners, joining components, welds, crevices and the like and yet is rigid in construction and capable of supporting several chickens. The skewer includes driving wings that radially extend from an arcuate shaped inner shaft and are configured to easily penetrate into the chicken and provide the driving means for rotating the chickens relative to the rotating drum.

SUMMARY OF THE INVENTION

An object of this invention is to provide an improved skewer for a rotisserie of the type that includes a rotating drum and means to rotate the skewer relative to the rotating drum.

A feature of this invention is a skewer that includes a one piece construction of uniform thickness including an arcuate elongated inner spine portion, a pair of spaced radially extending drive wings or fins extending the substantial distance of the elongated inner shaft. The wings extend from the inner spine portion to form substantially a 90 degree angle. The ends of the elongated spine portion are reduced and configured to be supported for rotary motion. One end is rounded to form a quasi circle in cross section to define a stub shaft for supporting one end of the skewer and the other end is configured in an arcuate shape to fit into a rotary skewer driver for supporting and imparting rotary motion to the skewer. The front and rear ends of the wings are tapered and configured to form a relatively pointed end for ease of inserting the skewer into the chicken. A tang adjacent to the end of the stub shaft and two radially abbreviated wings terminating at the same location as the tang limits the length of insertion of the stub shaft into the accommodating aperture formed in the rotating drum.

The foregoing and other features of the present invention will become more apparent from the following description and accompanying drawings.

DETAILED DESCRIPTION OF THE PREFERRED EMBODIMENT

Figure 1:
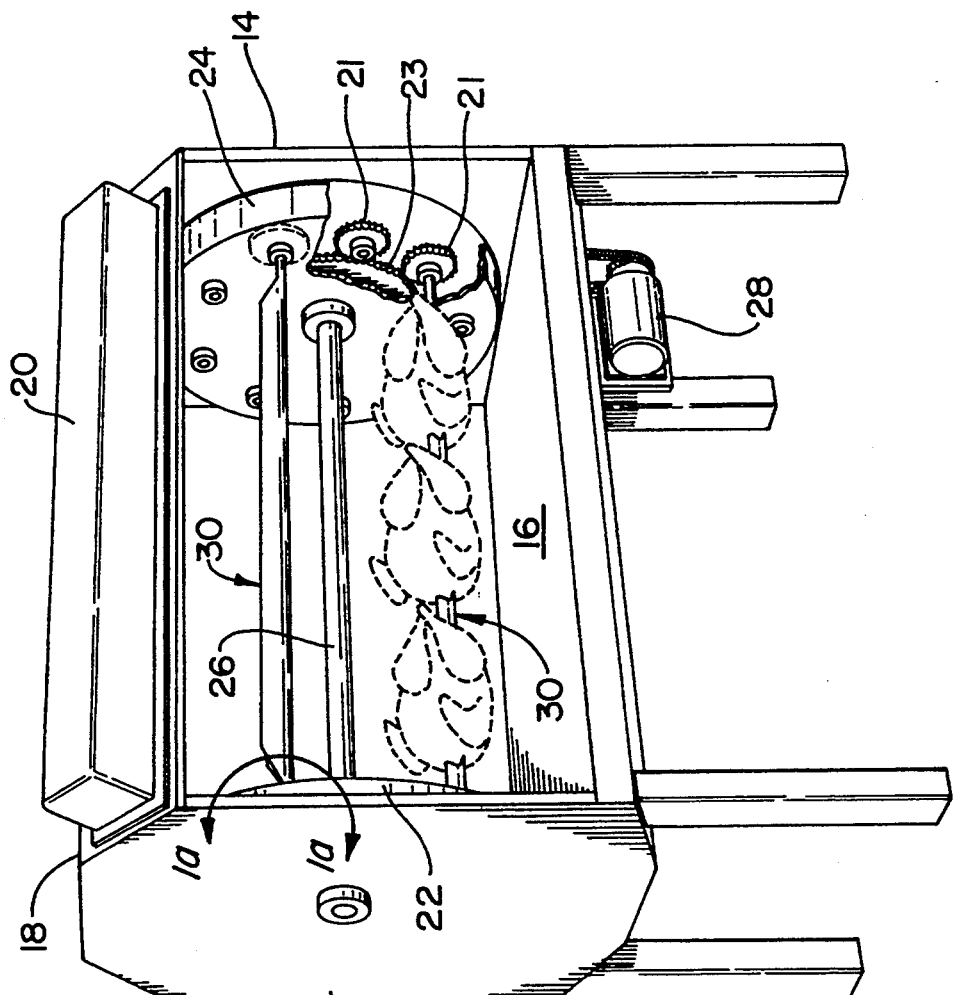
FIG. 1 is a schematic view in perspective illustrating the rotisserie with two skewers mounted therein.
Figure 1A:
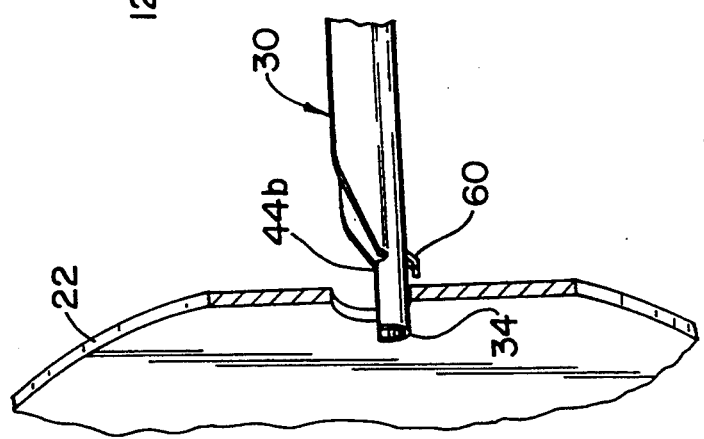
FIG. 1A is a partial view partly in section and partly in elevation illustrating the skewer end and bearing attachment.

While in its preferred embodiment the skewer of this invention is being described in conjunction with a commercial type of rotisserie, as one skilled in this art will appreciate, this skewer has utility for other types of rotisseries and including, but not limited to residential types of skewers. Additionally, it will be appreciated that in certain commercial rotisseries, double ovens with like amount of skewers are mounted in side-to-side relationship.

Reference is now being made to FIGS. 1-6 which disclose in detail the construction of the skewer. First, looking at FIG. 1 which is a schematic view of the rotisserie and the skewer, it will be noted that the rotisserie is an open type of oven generally indicated by reference numeral 10, having the opposite side walls 12 and 14, bottom wall 16 and the top wall 16. Fitted to the top wall is a gas fired heater 20 of the type that generates substantially 1600 degrees Fahrenheit that is mounted on a bias in the front end of the oven. A suitable heater is described in U.S. Pat. No. 4,927,355 granted to Haire et al on May 22, 1990 and entitled "Burner Assembly". A pair of rotating drums or reel plates 22 and 24 axially spaced relative to each other are supported to shaft 26 that is journalled in the bearings (not shown) supported in the apertures and formed in the side walls 12 and 14 for rotary motion. A suitable electric motor 28 and belt or chain are suitably connected to a drive pulley or sprocket gear for imparting continuous rotary motion to reel plates 22 and 24. A plurality of planet gears 21 rotatably supported to the reel plate 24 mesh with the bull or sun gear 23 that is soothingly restrained from rotating by side wall 14. As the reel plates 22 and 24 rotate by virtue of the motor 28 about central axis of shaft 26, the individual planet gears meshing with the teeth of sun gear or bull gear 23, rotate relative to the reel plates 22 and 24 causing the chickens to rotate in the cooking compartment of the rotisserie and rotate about the skewers that rotate relative to the reel plates. In this construction a different portion of the chickens face the heater 20 and its full intensity for each revolution until a full cycle, which say, may be every five revolutions of the reel plates, is attained. This not only effectuates even roasting, but also prevents overcooking any one portion of the chicken.

Figure 2:
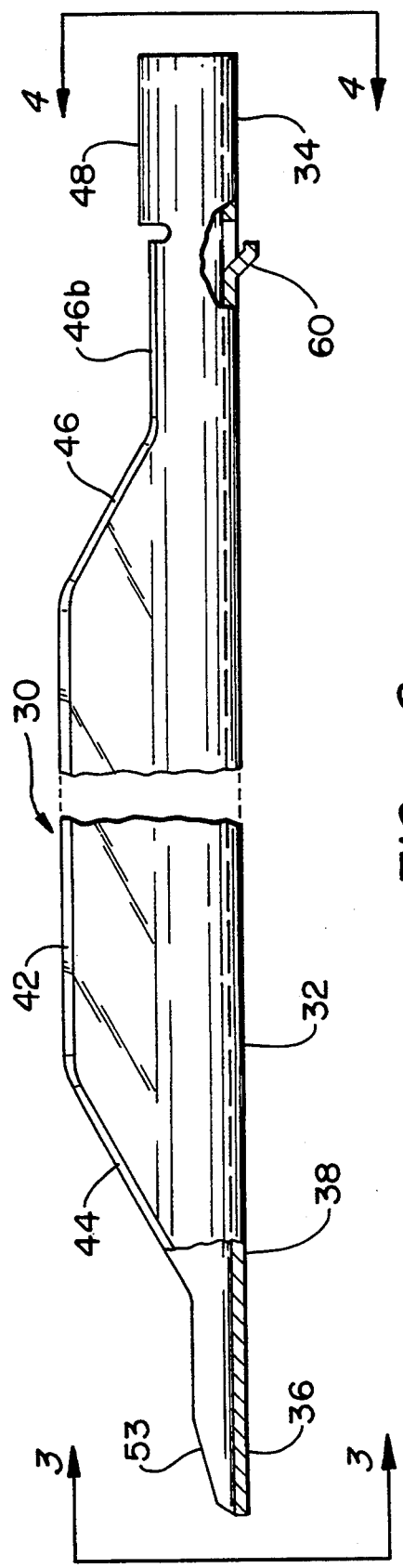
FIG. 2 is a view partly in elevation and partly in section illustrating the details of the skewer.
Figure 4:
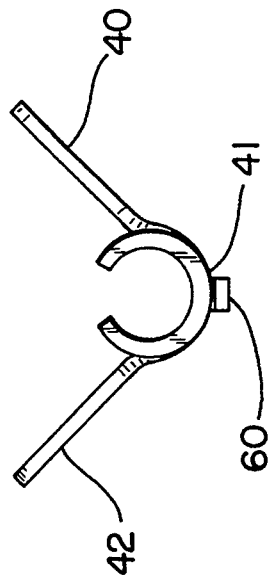
FIG. 4 is a rear end view taken along lines 4—4 of FIG. 3 illustrating the integral stub shaft of the skewer.
Figure 3:
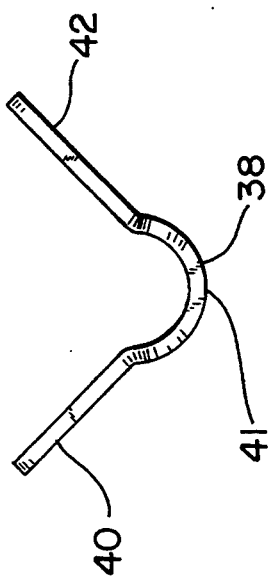
FIG. 3 is a front end view taken along lines 3—3 of FIG. 1 illustrating the driving end of the skewer.

As noted in FIG. 2, the skewer generally indicated by reference numeral 30 is comprised of a single elongated piece 32 fabricated from a metal or metal alloy and preferably stainless steel having a generally uniform thickness that is configured with opposing ends 34 and 36 for rotatably supporting the skewer to the reel plates 22 and 24. Essentially, the skewer includes a straight, elongated and arcuate spine portion 38 that circumscribes an arc that is substantially 270 degrees with the apex 41 or the point tangent to the vertical diameter facing the bottom of the skewer and defines an open ended trough. Opposing wings 40 and 42 angularly extend from opposing side edge portions of the spine portion 38 at the points remote from the apex 41 and form relative to each other a 90 degree angle and generally define a quasi U-shaped member in cross section. Obviously, each of the wings 40 and 42 relative to the apex 41 of the spine portion forms a 45 degree angle.

These dimensions are only illustrative as they may vary depending on the particular application. As noted the aft and fore edges 44 and 46 and 44a and 46a of wings 40 and 42 are tapered toward the spine portion 38, say, 60 degrees relative to apex 41 to form a front and rear facing pointed end. This serves to facilitate the mounting and removal of the chickens on the skewer.

Figure 2A:
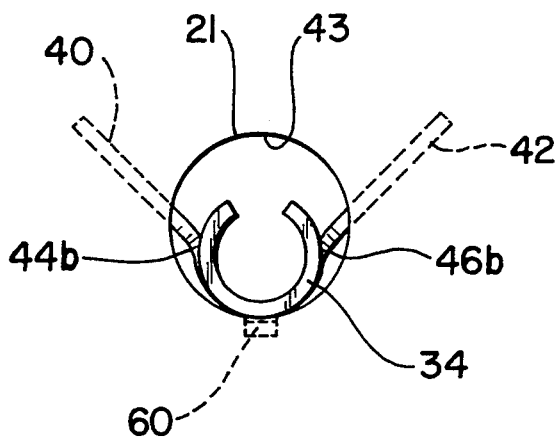
FIG. 2A is a schematic showing the end of the skewer with relationship to the reel plate in one position of rotation.
Figure 2B:
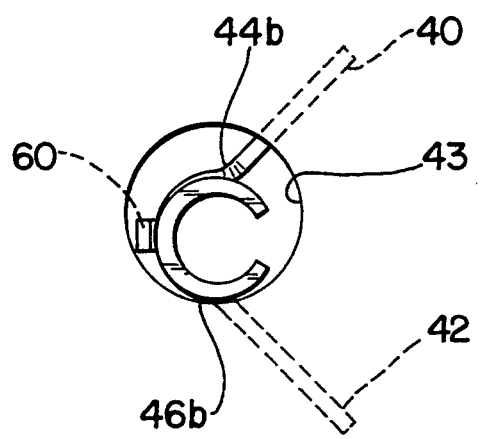
FIG. 2B is a schematic illustration of the elements in FIG. 2A showing the skewer in another position of rotation.
Figure 2C:
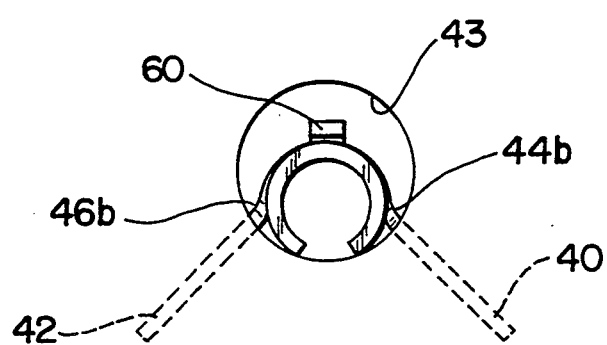
FIG. 2C is a schematic illustration of the elements in FIG. 2A showing he skewer in still another position of rotation.
Figure 5:
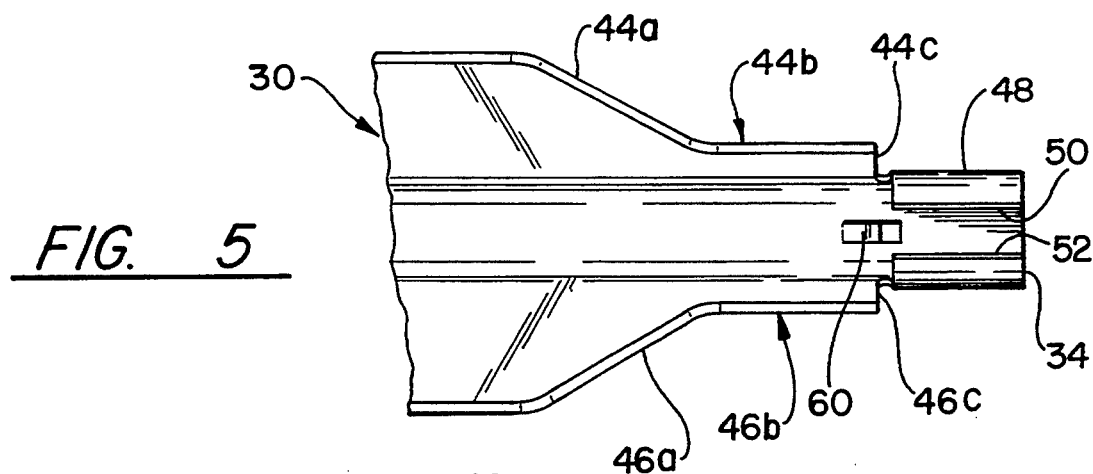
FIG. 5 is a fragmentary top plan view of the stub shaft portion of the skewer.
Figure 6:
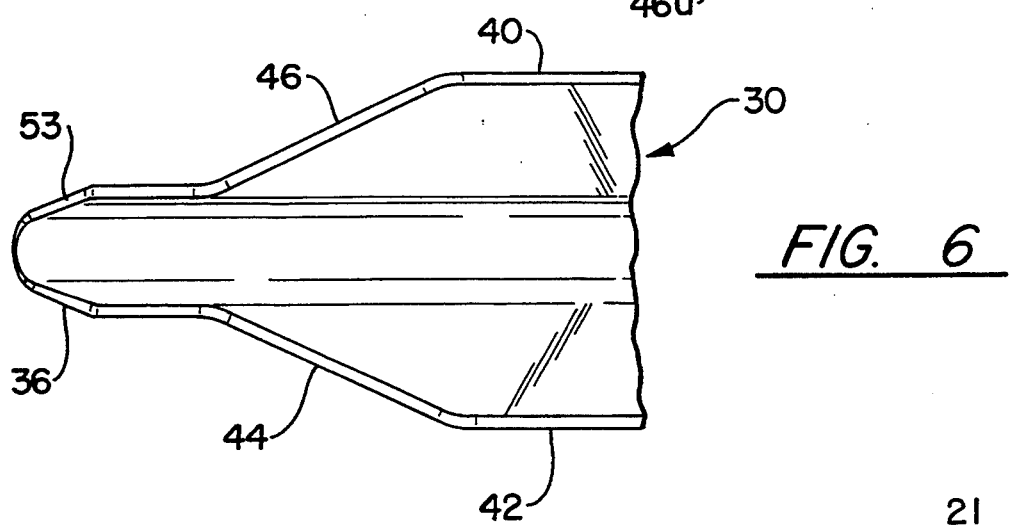
FIG. 6 is a fragmentary top plan view of the driving end portion of the skewer.

The end 34 of skewer 30 is reduced and is configured in a generally circular shape that serves as a stub shaft 48 that is dimensioned to fit into the aperture formed in the reel plate 22 for being supported therein for rotary motion. The opposing side edges 50 and 52 of the stub shaft 48 may be spaced relative to each other for ease of manufacturing and the space would depend on the freedom of rotary motion in the bearing formed in the aperture of the reel plate 22. The opposing end 36 is likewise reduced and tapered toward the apex 41 to form the tapered surface 53 (see FIG. 2) to define a combined pointed end and drive end that fits into a recess formed in the skewer drive which as will be described in more detail immediately herein below. The pointed portion of end 36 also serves to facilitate the insertion of the skewer into the chicken cavity much like a pointed spear. Tang 60 punched out from the spine 32 extends radially outward from the bottom surface and serves to limit the axial movement of the skewer when inserted into the aperture formed in the reel plate 22. The shoulders 44c and 46c of the extended wing portions 44b and 46b as shown in FIGS. 2A, 2B and 2C serve the same purpose as the tang 60 in limiting axial movement as the skewer rotates through one complete rotation, i.e. 360 degrees, about its axis. As noted, and as evident from viewing FIGS. 2A, 2B and 2C, since the skewer rotates relative to reel plate 22 and is at a different relative location with respect to the reel plate 22 and since the diameter of aperture 27 in reel plate 22 is larger than the diameter of the stub shaft 48, the gravitational forces on the skewer will place the tang 60 out of contact with the reel plate during certain angles of revolution and without any precautions could cause the skewer to migrate further into the aperture and cause the skewer to become dislodged from the skewer driver 54. To obviate this problem the extended wing portions 44b and 46b project radially outward and define shoulders 44c and 46c that engage the reel plate 22 at given gravitational orientations of the skewer (when the tang 60 is out of engagement) to constrain axial movement and avoid the inadvertent dislodging of the skewer from the skewer driver.

Figure 7:
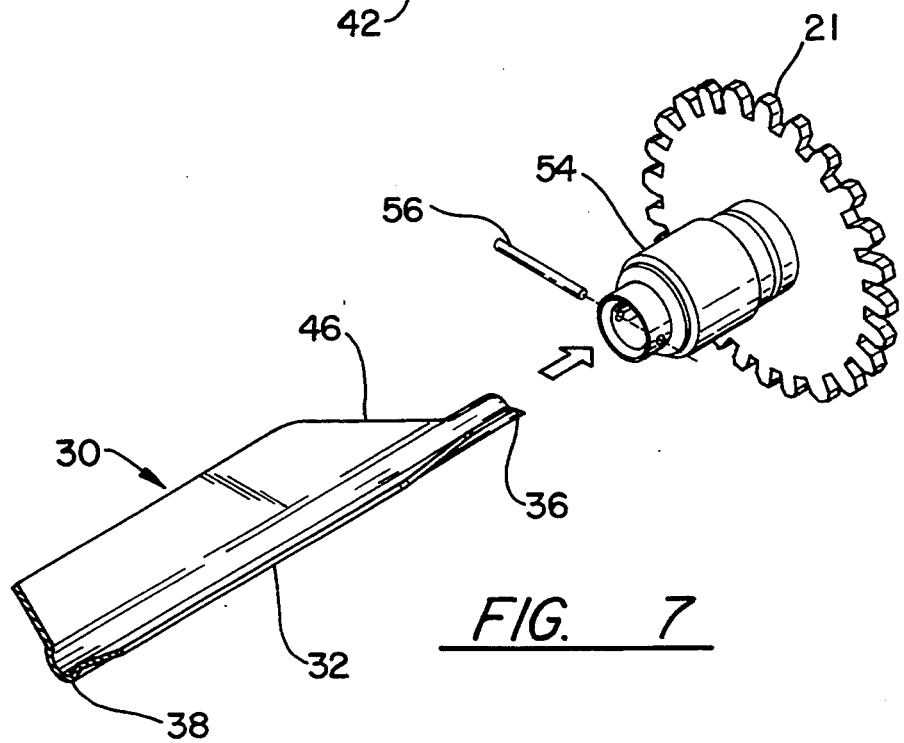
FIG. 7 is an exploded view illustrating the skewer driver and the drive end of the skewer.

To install the skewer the stub shaft 48 is first inserted into the aperture 27 in the reel plate 22 that serves as a journal bearing and is moved axially toward the left side as viewed in FIG. 1 until the end 32 of the skewer aligns with the opening in the skewer driver 54. The diameter of aperture 27 is sufficiently large to allow the end 34, including tang 60 and wing portions 46b and 44b to penetrate therein. This allows the skewer 30 to move sufficiently to the left as viewed in FIG. 1 to allow the end 32 to be inserted in the skewer driver 54. As noted in FIG. 7, skewer driver 54 is a hollow sleeve that is affixed to the planet gear 21 at one end as shown in FIGS. 1 and 7. The other end opposite the planet gear 21 defines the recess formed by the pin 56 and the wall of the hollow sleeve. The pin 56 extends through the sleeve and bisects the circular bore defined by the sleeve so that either portion on either side of the pin 56 defines the recess that accommodates the end 34 of skewer 30. The skewer drive end 36 fits into either recess which facilitates the assembly of the skewer in the rotisserie.

As is apparent from the foregoing, the tapered portion 53 fits into either one of these recesses and engages the pin 56. This tapered portion 53 serves the dual function of rotary driving the skewer with the rotation of the planet gear 21 and limiting the axial movement of the skewer in one direction. Hence, the end 34 that is inserted in the reel plate 22 is allowed to penetrate the bearing and can travel until the tapered portion 44 and 44 of the wings prevent further penetration. The skewer is then moved to the right for installing the end 36 in the driver skewer 54 and the tang 60 or the shoulders 44c and 46c are withdrawn from the aperture 27 and one or the other comes into engagement with the front face of reel plate 22 and prevents further axial movement in the left direction. With the stub shaft 48 now in the operative position the tapered end 36 is in proper position in the skewer driver 54 as shown in FIGS. 1 and 7. The tapered portion 53 is now in engagement with the drive pin 56. When stub shaft 48 is riding on the bearing formed in aperture 43 during rotisserie operation, the amount of axial retracting movement of skewer 30 is constrained by the tapered surface 53 on the tapered end 36 in one axial direction and the tang 60 and shoulders 44c and 46c in the opposite axial direction to prevent the skewer from inadvertently falling out of the skewer driver 54 and reel plate 22.

In accordance with this invention, the skewer which is a one piece unit of uniform cross section is formed with virtually no crevices, no corners, no separate bonded or welded pieces and screws or the like that would have the propensity to collect food matter. It is essentially a smooth piece that is easy to clean and hence, easy to keep sanitary. The skewer is easily mounted in and removed from the rotisserie and the skewer is easily inserted in the cavity of the chickens. The wings engage the inner structure of the chicken and serve as a driving means to assure a positive rotation of the chickens with the rotation of the skewer and the rotation of the reel plate. This obviously is extremely important in rotisseries that operate in these high temperature ranges. In addition, the skewer is easy to insert into the reel plates of the rotisserie and is so designed as to assure the positive rotation of the skewer and the inadvertent dislodgement of the skewer from either the skewer driver or the bearing defined by aperture 27 in the reel plate 22.

Although this invention has been shown and described with respect to detailed embodiments thereof, it will be appreciated and understood by those skilled in the art that various changes in form and detail thereof may be made without departing from the spirit and scope of the claimed invention.

I claim:

1. A skewer adapted to fit into a pair of axially spaced reel plates for rotary motion in a rotisserie for supporting a chicken to be cooked in the rotisserie, one of said pair of reel plates having a skewer driver for rotating the skewer relative to said pair of reel plate, said skewer being formed from a single piece comprising an elongated member of substantial uniform thickness having an arcuate shaped spine portion, a pair of spaced wings angularly extending from the peripheral sides of said spine portion and extending substantially the length of said elongated member for defining a rotary drive for said chicken, a first end of said spine portion projecting axially beyond said pair of wings and being tapered to a dimension adapted to fit into a cavity of the skewer driver for being rotated thereby about its rotating axis, at least one end of each of said pair of wings being tapered to define a generally pointed end for receiving said chicken, a second end of said spine portion opposite from said first end of said spine portion extending axially from said spine portion and being configured into a generally cylindrically shaped portion for defining a stub shaft for fitting into an aperture of the other of said pair of reel plates that is remotely disposed from said skewer driver whereby said skewer rotates with and relative to said pair of reel plates.

2. A skewer as claimed in claim 1 wherein the other end of each of said pair of wings being tapered in a direction to form a pointed end of said skewer.

3. A skewer as claimed in claim 2 wherein said pair of wings are oriented to define a ninety degree angle.

4. A skewer as claimed in claim 3 wherein each of said pair of wings defines with the apex of the spine portion a forty-five degree angle.

5. A skewer as claimed in claim 4 including a tang extending radially downward from said spine portion adjacent to said stub shaft.

6. A skewer as claimed in claim 5 including an extended wing portion adjacent to said stub shaft defining a pair of shoulders in axial alignment with said tang.

7. A skewer as claimed in claim 6 wherein said taper of said first end is substantially 15 degrees relative to said spine portion.

8. A skewer as claimed in claim 7 wherein said taper of said pair of wings is substantially equal to sixty degrees relative to said spine portion.

9. A skewer as claimed in claim 8 wherein said skewer is fabricated from stainless steel.

* * * * *